(12) United States Patent
Martin

(10) Patent No.: US 6,384,776 B1
(45) Date of Patent: May 7, 2002

(54) EM SIGNAL DETECTION AND POSITION BROADCASTING SYSTEM AND METHOD

(76) Inventor: B. Todd Martin, 1811 W. Lakeview Dr. E2, Johnson City, TN (US) 37601

( * ) Notice: Subject to any disclaimer, the term of this patent is extended or adjusted under 35 U.S.C. 154(b) by 0 days.

(21) Appl. No.: 09/302,669

(22) Filed: Apr. 30, 1999

(51) Int. Cl.[7] .............................. G01S 5/02; H04B 7/185

(52) U.S. Cl. .......................... 342/357.09; 342/357.06; 342/357.13; 342/20; 701/213

(58) Field of Search .................. 342/357.01, 357.06, 342/357.07, 357.09, 357.13, 457, 27, 28, 20; 701/208, 213

(56) References Cited

U.S. PATENT DOCUMENTS

| | | | |
|---|---|---|---|
| 5,223,844 A | * 6/1993 | Mansell et al. | 342/357 |
| 5,506,587 A | * 4/1996 | Lans | 342/357 |
| 5,907,293 A | * 5/1999 | Tognazzini | 340/903 |
| 5,926,117 A | * 7/1999 | Gunji et al. | 340/988 |
| 5,936,574 A | * 8/1999 | Klaschka | 342/357.06 |
| 5,983,161 A | * 11/1999 | Lemelson et al. | 701/301 |
| 6,118,403 A | * 9/2000 | Lang | 342/357.09 |

OTHER PUBLICATIONS

Cobra Safety Alert, U.S. Department of Justice, Federal Bureau of Investigation, Federal Railroad Administration, Operation Lifesaver, p. 1–2.*

* cited by examiner

Primary Examiner—Dao Phan
(74) Attorney, Agent, or Firm—Roberts, Abokhair & Mardula, LLC

(57) ABSTRACT

A system and method for alerting a driver to the presence of an EM signal from a police speed sensor signals (RADAR/LADAR), emergency vehicle signals and traffic hazard warning signals using RADAR/LADAR detectors and coupled GPS positioning system an transceiver. The system receives electromagnetic signal emissions and records the location of the Signal, providing that information to a central processor. A GPS system constantly updates the vehicle position so that the processor can note the vehicle position at the time the Signal was received. The GPS position signal is reformatted and broadcast to other vehicles having similar units. When a position signal is received by the transceiver, it is stored and compared to the present position of the driver's vehicle. When the vehicle is within a predetermined range if the police sensor position that was broadcast, a signal is sent to the driver in audible, visual, voice or a combination of these means notifying the driver that the automobile is within range of a Signal. A base station coordinates and transmits reports of EM signal to drivers.

10 Claims, 4 Drawing Sheets

EM SIGNAL DETECTION AND POSITION BROADCASTING SYSTEM AND METHOD

FIELD OF THE INVENTION

This invention relates generally to devices to detect police speed sensors for traffic use which operate in the electromagnetic (EM) spectrum such as RADAR/LADAR. More particularly the present invention is a RADAR/LADAR detector linked with a Global Positioning System (GPS) receiver and radio frequency transceiver.

BACKGROUND OF THE INVENTION

RADAR detectors have long been used by drivers to detect the presence of police locations so that they can drive without the fear of receiving a traffic ticket. Thus the device serves to slow drivers who are exceeding safe speeds. As the technology available to police and others has improved, so has the technology related to detectors. Now RADAR and LADAR detectors are available to sense most of the police active traffic monitoring equipment, as well as the presence of emergency vehicles and traffic hazard warning devices. While this causes traffic (at least for those having detectors) to slow down in the immediate vicinity of the signal emitted, the inventions relating to RADAR/LADAR and other sensor detectors does little to broadcast an advance warning to other drivers, thus slowing those drivers in advance of actually sensing the presence of the signal.

What would therefore be useful is a device that detects the presence of police RADAR/LADAR and other sensor locations, notes the location of the sensor, and broadcasts that location to other drivers who are in a well-defined proximity to the sensor. Other drivers could then receive information on the sensor location and moderate their driving well in advance of the sensor location. This will lead to larger zones of safe driving in compliance with local laws; a goal sought by all traffic regulating authorities.

SUMMARY OF THE INVENTION

It is therefore and object of the present invention to combine the detection of electromagnetic (EM) spectrum emissions from police speed sensor signals (RADAR/LADAR), emergency vehicle signals and traffic hazard warning signals (collectively, the "Signals") with the identification of the general position of those Signals.

It is a further objective of the present invention to determine the position of the Signals via GPS receiver technology.

It is a further objective of the present invention to broadcast the location of the Signals to other drivers.

It is yet another objective of the present invention to be able to receive the Signals broadcast from the present invention as a means of warning other drivers having the present invention of the position of the Signals.

It is a further objective of the present invention to enhance the safety of the driving experience through the knowledge of police speed traps, emergency vehicles and traffic hazards.

These and other objectives of the present invention will become apparent to those skilled in the art from a reading of the specification that follows.

The present invention is an integrated sensor detector and transceiver having the capability to receive and detect the presence of EM signal emitting police speed sensors, EM signal emitting emergency vehicles, and EM traffic hazard signals, record the position of those Signals, and broadcast the detected position of those Signals. The present invention can further receive Signals from other like units, and/or a base station managing the wireless network of the present invention and output the Signal position data at the appropriate time to the driver so as to become aware of speed detection locations and moderate vehicle speed to avoid undesirable traffic tickets. The present invention will also allow drivers to detect emergency vehicles and traffic hazards EM signals. This will allow, in turn, the driver to become more cognizant of traffic conditions by being warned in advance to adhere to the posted speed limits, to avoid collisions with or the obstruction of emergency vehicles and avoiding possible hazards such as accidents, weather and other road hazards.

A plurality of vehicular carried units comprise one embodiment of the present invention. Each such unit comprises a GPS receiver, which are becoming increasingly accurate and small, for detecting the vehicle's position at any time. A Signal detector is integrated into the unit for detecting the EM Signals emitted by police speed sensors, emergency vehicles and traffic hazard warnings. Finally, a transceiver is connected to the GPS and EM Signal detector for broadcasting Signal emitting position location and receiving broadcasts of Signal positions from like units of other vehicles. The activities of each unit are coordinated by a microprocessor which functions as more fully set forth below.

The GPS, the EM Signal detector and the transceiver are all linked to the central processor which integrates and compares the signals being received from the constituent parts. For example, the GPS receiver constantly determines and outputs a position signal to the processor. The processor does not accept those signals for further processing until such a time as an EM Signal is received.

When the detector detects an EM Signal, it sends a signal to the processor. The processor uses that detection signal to trigger recording of the GPS position determined at the time of receipt of the EM Signal detection signal.

The processor then formats the GPS position determination for broadcasting via the transceiver. The transceiver is then triggered to broadcast the position determination for a period of time.

The determination of the position of the Signal is determined by recording the strength of the Signal as determined by the detector as is now commonly done with most RADAR detectors. When the signal is of sufficient strength, the processor marks the time and accepts the GPS position determination for that point in time. The position is then broadcast.

In the receive mode, the transceiver of present invention simply awaits a signal transmission from like units in the cars of other drivers. When a signal is received, it is first stored by the processor since the car of the driver receiving the signal may not be sufficiently close to the Signal detected. The processor then monitors the GPS position signals it is receiving and compares those position signals to the stored Signal from the second driver's device.

When, within a pre-established time frame, the comparison of the received position Signal from another driver is within a pre-determined alert range, the processor provides a signal to the driver, with such signal being an audible tone, voice warning, illuminated warning or any combination of the above.

In alternate embodiment of the present invention, a base station coordinates all of the reporting of the various EM Signal detectors, storing reports of locations for further transmission over a wireless network to other units of the present invention. The base station embodiment allows for position locations to be stored longer and to be broadcast to more vehicles over a given time. Further, the base station can receive periodic updates on the position of specific sensors thereby allowing the base station to signal the sensor, via its transceiver, that it is approaching a "city" area. This signal can automatically switch the sensor from "highway" to "city" thereby eliminating false positives for both the driver and the system itself.

DETAILED DESCRIPTION OF THE INVENTION

As noted above, the present invention is a combination unit comprising a transceiver, a GPS sensor, an EM Signal detector and a processor, which integrates the signal processing receiving and transmission of each such unit. In one embodiment of the present invention, a base station serves to coordinate the receipt and transmission of positions reported by EM sensors of the present invention.

Figure 1:
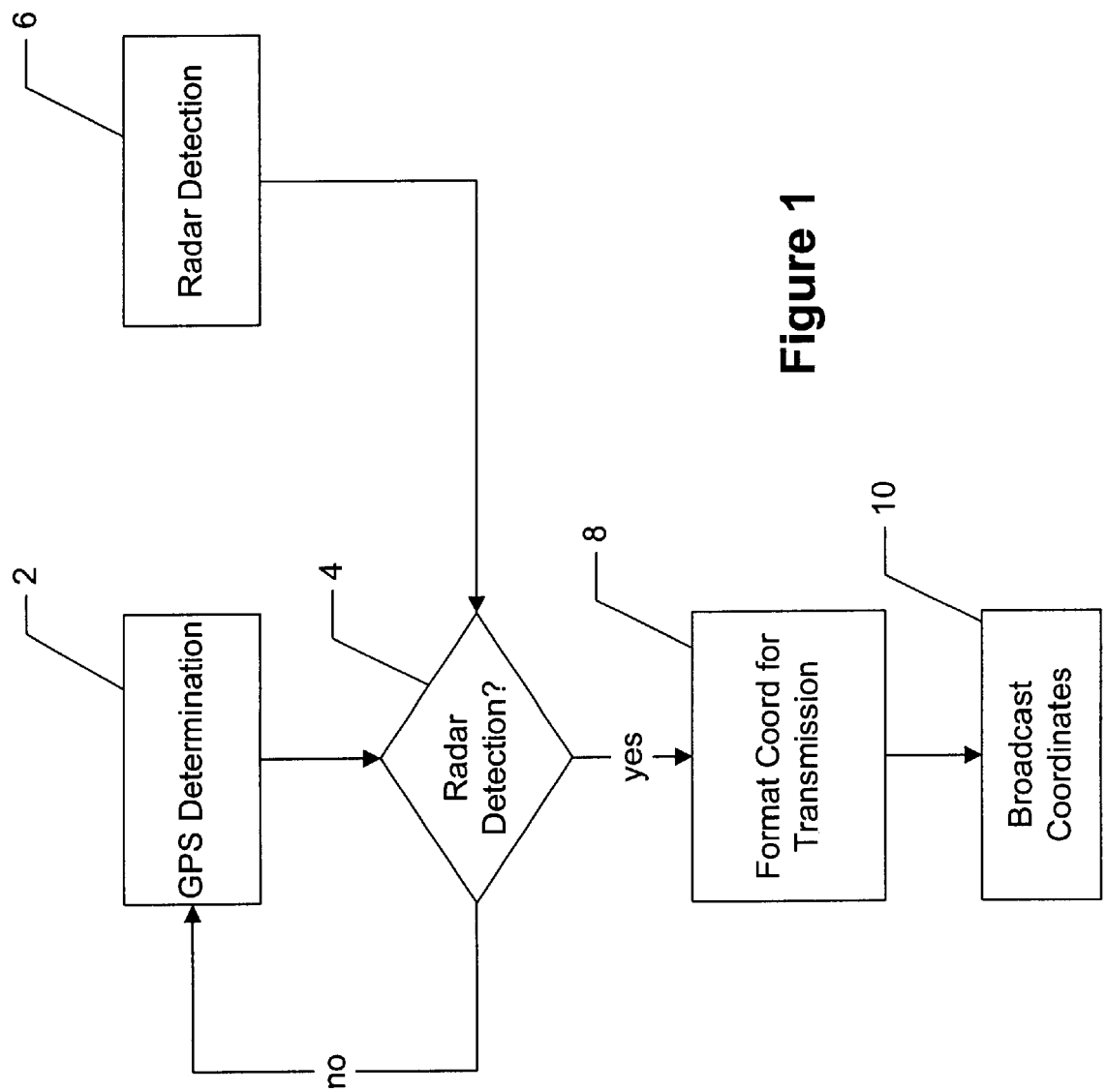
FIG. 1—Illustrates the data processing of the present invention during the detection mode of operations.

Referring to FIG. 1, the data processing of the present invention during the detection mode of operations is illustrated. The GPS unit 2 constantly receives and determines the position of the driver's vehicle. That signal is provided to the onboard processor of the present invention on a constant basis.

Simultaneously, the EM Signal detector 6 is constantly scanning the EM spectrum to determine the presence of Signals. Once a Signal is detected, a signal is generated and sent to the processor. This signal sending continues and increases in strength as the driver's car approaches the Signal. When the Signal reaches a predetermined strength connoting that the driver's car is near to the Signal, the processor reads the position signal coming from the GPS receiver.

The processor constantly awaits the receipt of a EM Signal detection signal 4. Upon receipt, as noted above, the processor acts on the GPS signals it is receiving.

After accepting the GPS position signal after receiving the RADAR/LADAR detection Signal, the processor formats the GPS signal for broadcasting by the transceiver 8. The position is then broadcast 10 to the other automobiles having similar units of the present invention.

Each unit of the present invention possesses a unique digital identity. Therefore, the broadcasting of the position message also includes the unique digital ID of the unit doing the broadcasting. In the embodiment where a base station, and its associated processor is provided, this allows signals detected to be stored and sorted not only by location but by the sensor ID as well. Thereafter, upon receipt of a Signal by a base station, the sensor ID can be visually displayed using mapping software resident in the base station processor.

The base station processor of the present invention comprises an IBM PC or compatible using the Pentium® microprocessor typically with 64K of memory and disk storage sufficient to store application programs and a mapping database such as that offered by the DeLorme corporation.

Figure 2:
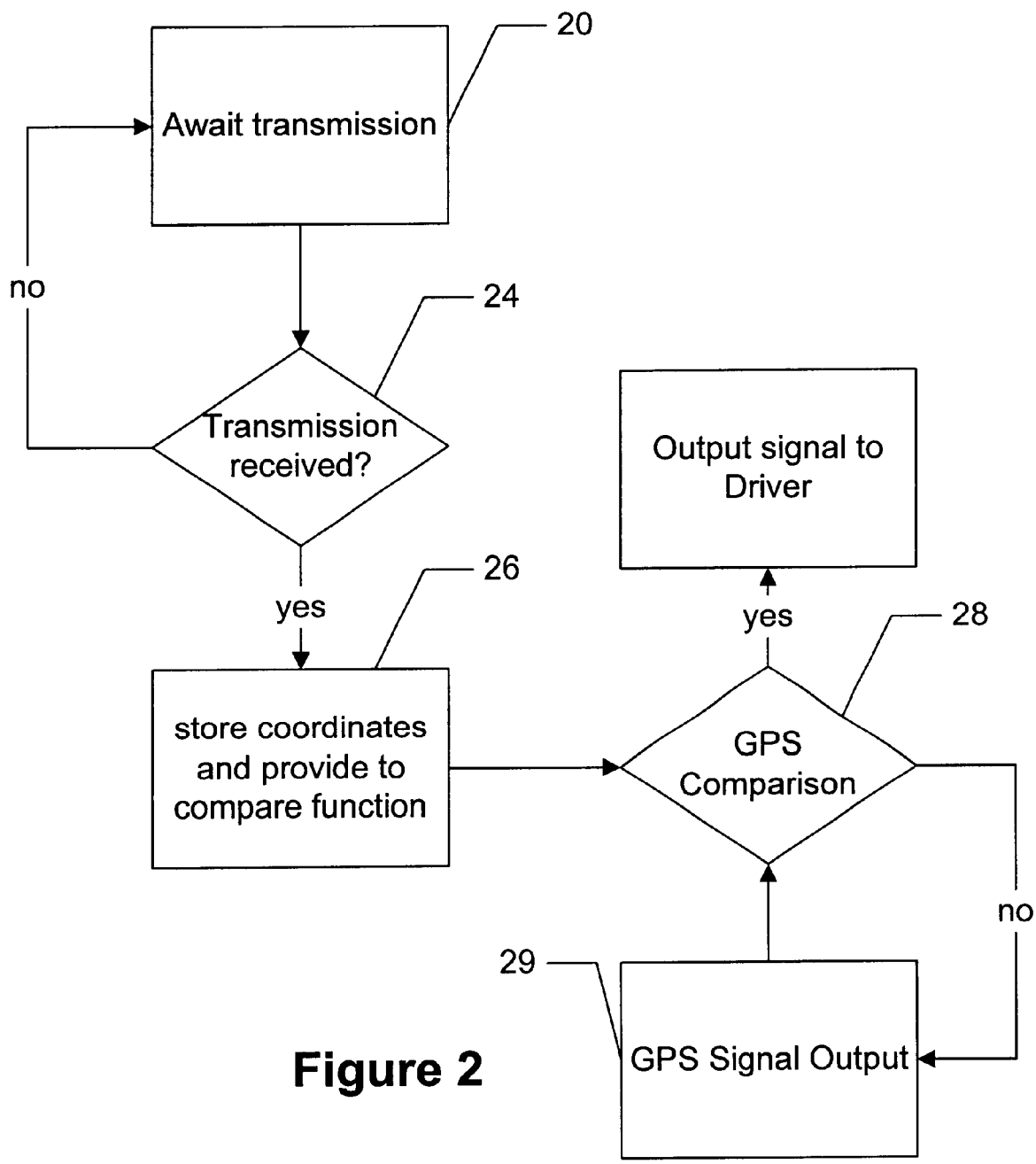
FIG. 2—Illustrates the data processing of the present invention during the monitoring mode of operations.

Referring to FIG. 2 the data processing of the present invention during the monitoring mode of operations is illustrated. In addition to its other functions, the transceiver constantly awaits transmission of position data 20 from other operators having units of the present invention. The processor of the present invention constantly checks to determine if a transmission of position data is being received 24 from the transceiver.

When a transmission is received, the processor stores the GPS coordinates transmitted 26. The processor then begins a comparison of the stored coordinates with GPS data 28 to determine if the driver's automobile is near to the position transmitted from the second driver. Thus the processor continues to receive the GPS output signal 29 and continues to compare that signal to the stored position data until a match is made.

The "match" of GPS data to transmitted position data does not have to be exact. In fact, the processor performs calculations designed to give the driver a significant margin of error so that the driver will be warned well in advance of the position of the police sensor.

When the processor determines that the driver's car is near to the position transmitted from the second driver, the processors outputs a signal to the driver of the proximity of the Signal. This signal can be audible, a synthesized voice, a visual signal or any combination of these signals. In this way the driver is warned of the presence of the Signal that was detected along with the identity of the EM sensor that detected the signal.

Figure 3:
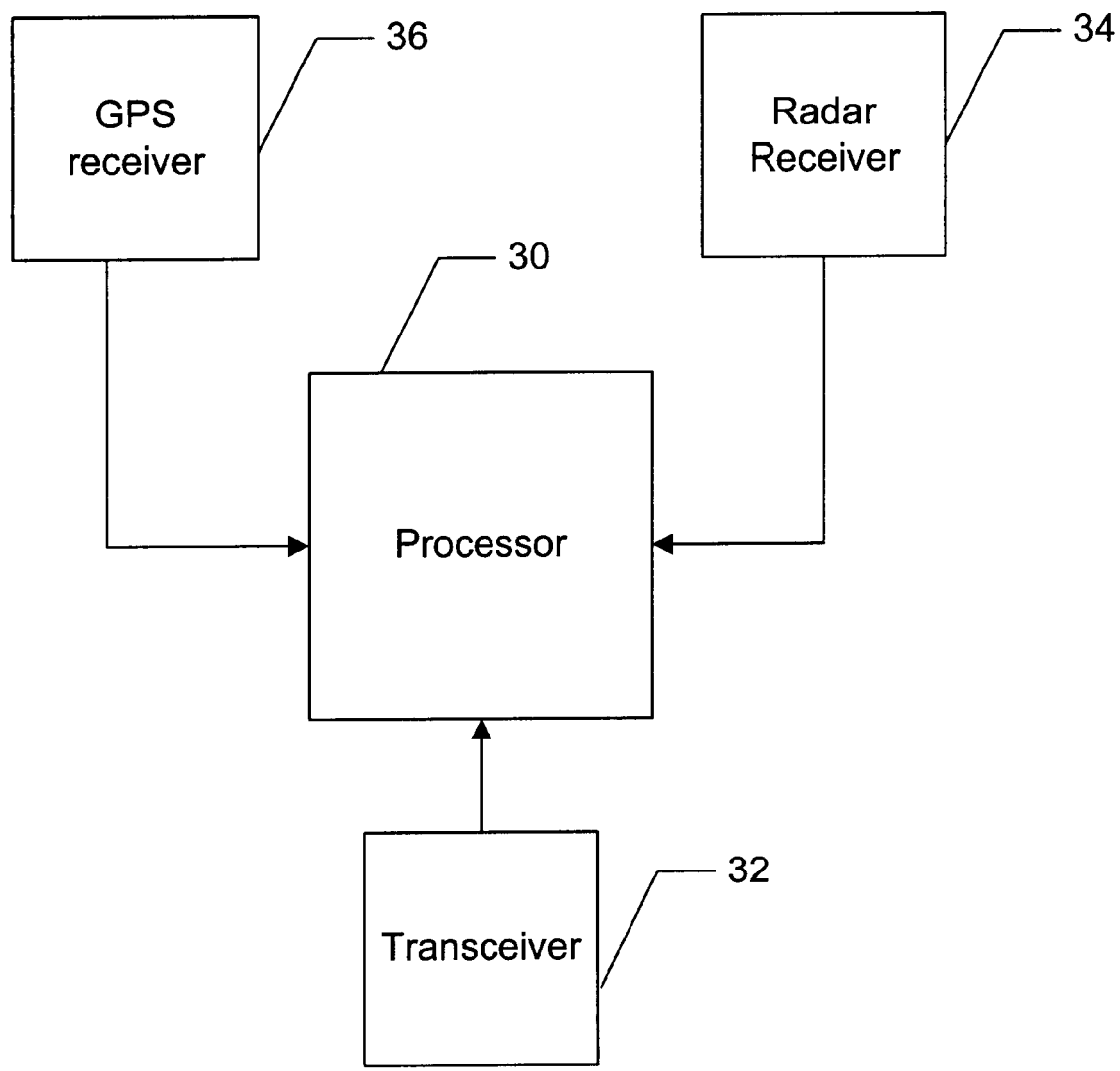
FIG. 3—Illustrates an overview of the architecture of the present invention.

Referring to FIG. 3, the general architecture of the present invention is illustrated. The GPS receiver 36 provides GPS location data to central processor 30. Similarly, the RADAR/LADAR receiver 34 provides its signal data to the central processor 30.

The central processor 30 also receives signals from and sends signals to the transceiver 32. Thus the central processor 30 provides formatted position data for transmission by the transceiver and receives position data received from other drivers in order to alert the driver of the presence of Signals when the driver nears those sensors.

Figure 4:
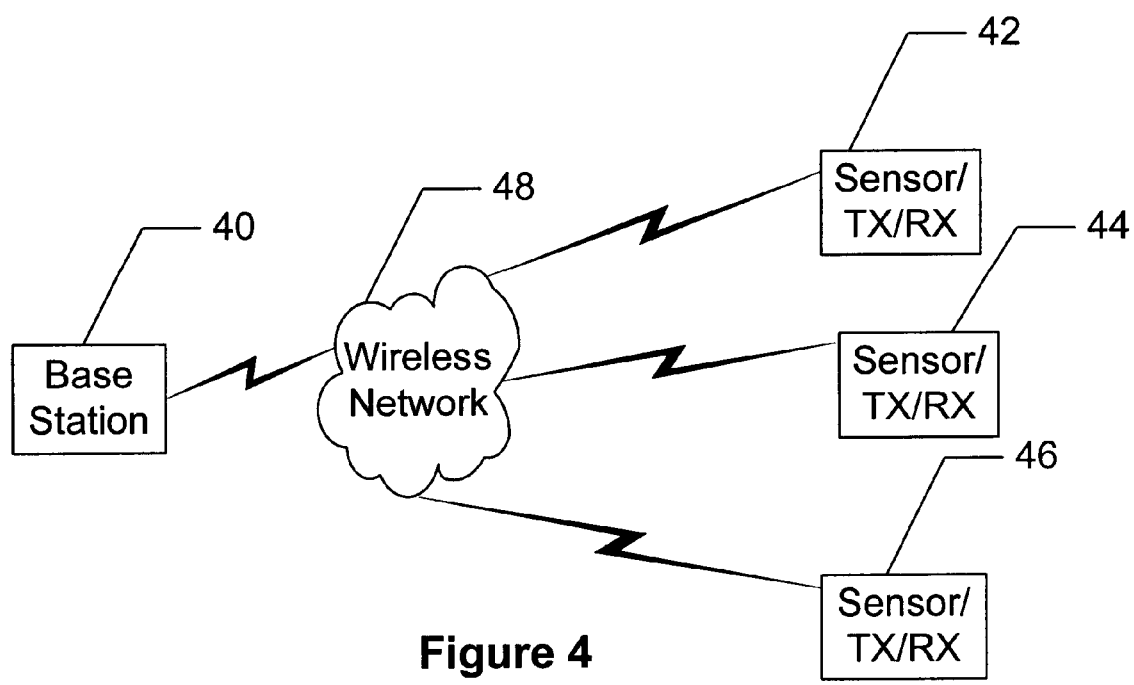
FIG. 4—Illustrates the base station implementation of the present invention.

Referring to FIG. 4 the base station embodiment of the present invention is illustrated. EM Sensors 42, 44, and 46 are linked in a wireless network 48 to base station 40. These sensors periodically report their positions to the base station along with their digital ID's. When signal are detected by any of the EM sensor units 42,44, and 46 a position detection message is sent to the base station. The base station stores the position determinations and tracks the positions of the vehicles carrying EM Sensors of the present invention. When a vehicle carrying one of the EM Sensors of the present invention comes Within a predetermined range of the EM Signal detected, the base station transmits a warning notice to the vehicle, alerting the vehicle to the presence of the EM Signal generator. The base station 40 also comprises mapping software that displays the position of individual sensors of the present invention that are within range of the base station 40. Using this software, the individually identified sensors can be visually displayed for the base station operator.

In an alternate embodiment of the present invention, the unit is carried by hikers, campers, police and soldiers in the field and other who can benefit from position determination. In this embodiment, the unit operates in much the same fashion as noted above. However, if a person wants to determine the location of the wearer (carrier) of the present invention, such a person would transmit an EM signal, which would be picked up by the present invention. The position of the wearer of the present invention would then be determined by the GPS receiver, sent to the microprocessor for formatting and transmitted via the integral transceiver of the present invention. Thus precise position could be broadcast without interaction by the wearer of the present invention.

In an alternate embodiment of the present invention, GPS psotion of the sensors of the present invention are periodically updated to the base station 40. Base station 40, with its mapping software, tracks the sensors and determines when any given sensor is approaching or is located in a "city" environment. Upon such a determination, the base station sends a signal to the particular sensor 42, for example, to switch its sensitivity from "highway" to "city" thereby eliminating false positives to both the driver and the system itself.

An EM Signal/GPS positioning system with coupled transceiver has now been shown. It will be appreciated by those skilled in the art that other variations in the present invention will be possible without departing from the scope of the invention as disclosed. Accordingly, the present invention should be determined only from the claims presented herewith.

I claim:

1. An electromagnetic (EM) signal detection and position broadcasting system comprising:
    a plurality of integrated units, each integrated unit mounted in a vehicle of a first party and comprising;
        a global positioning system (GPS) receiver adapted to continuously output a changing determined position;
        a microprocessor comprising storage connected to the GPS receiver and adapted to receive the changing determined position;
        an EM signal detector connected to the microprocessor adapted to provide a notification to the microprocessor when a non-reflected EM signal from a third party is received;
        the microprocessor further comprising instructions stored in the storage adapted to designate an EM signal position calculated from the changing determined position when the notification is received and adapted to format a transmitted EM signal position into a form transmittable by a transceiver; and
        a transceiver connected to the microprocessor adapted to broadcast the EM signal position directly to another one of said plurality of integrated units mounted in
    a vehicle of a second party;
        wherein said EM signal is selected from the group consisting of police traffic RADAR, police traffic LADAR, emergency vehicle RADAR, emergency vehicle LADAR, road traffic hazard RADAR and road traffic hazard LADAR.

2. The electromagnetic (EM) signal detection and position broadcasting system of claim 1:
    wherein the transceiver is adapted to receive received EM signal positions; and
    wherein the microprocessor further comprises instructions adapted to store the received EM signal positions, compare the received EM signal positions to the changing determined position, and output a warning to a driver of said vehicle of a first party when the changing determined position is within a predetermined range of the received EM signal position.

3. A method of determining and transmitting the position of an EM signal comprising:
    detecting a non-reflected EM signal from a third party in a vehicle of a first party via an EM sensor;
    determining the position of the vehicle at the time the EM signal is detected via a GPS system; and
    broadcasting the position of the vehicle determined by the GPS system directly to a vehicle of a second party when the EM signal is detected;
    wherein said EM signal is selected from the group consisting of police traffic RADAR, police traffic LADAR, emergency vehicle RADAR, emergency vehicle LADAR, road traffic hazard RADAR and road traffic hazard LADAR.

4. The method of determining the position of an EM signal of claim 3 wherein determining the position of the vehicle at the time the EM signal is detected further comprises:
    continuously outputting a changing determined position of the vehicle using a GPS receiver;
    outputting the changing determined position to a microprocessor comprising storage;
    the microprocessor receiving a notification from the EM sensor when the EM signal is detected; and
    the microprocessor further calculating a determined vehicle position corresponding to the changing determined position at the time the EM signal is detected;
    and wherein broadcasting the position of the vehicle comprises transmitting the determined vehicle position using a transceiver.

5. The method of determining the position of an EM signal of claim 4 further comprising:
    the transceiver receiving a second determined vehicle position from a second vehicle;
    storing the second determined vehicle position;
    comparing the second determined vehicle position to the changing determined position; and
    providing a signal to a driver of the vehicle of the first party when the second determined vehicle position is within a predetermined range of the changing determined position.

6. The electromagnetic (EM) signal detection and position broadcasting system of claim 1 wherein the transceiver further comprises a unique digital identifier.

7. The electromagnetic (EM) signal detection and position broadcasting system of claim 1 further comprising a base station comprising a base station transceiver and connected in a wireless mode to the transceiver and adapted to receive EM signal positions.

8. The electromagnetic (EM) signal detection and position broadcasting system of claim 7 wherein the base station further comprises storage adapted to store the EM signal position transmitted by the transceiver and instructions adapted to transmit the EM signal position to any of the plurality of integrated units when any of the plurality of integrated units comes within a predetermined range of the EM signal position.

9. The electromagnetic (EM) signal detection and position broadcasting system of claim 7 wherein the base station further comprises mapping software adapted to display visually to a base station operator the position of any of the plurality of integrated units vehicle positions.

10. The electromagnetic (EM) signal detection and position broadcasting system of claim 9 wherein the base station further comprises instructions adapted to notify an integrated unit when the integrated unit is in a "city" environment and provide instruction to the integrated unit to switch its EM signal detection sensitivity from "highway" to "city" thereby avoiding false positives.

* * * * *